May 24, 1949. L. E. GLOVER 2,471,322
MICROMETER GAUGE AND THE LIKE
Filed July 28, 1944
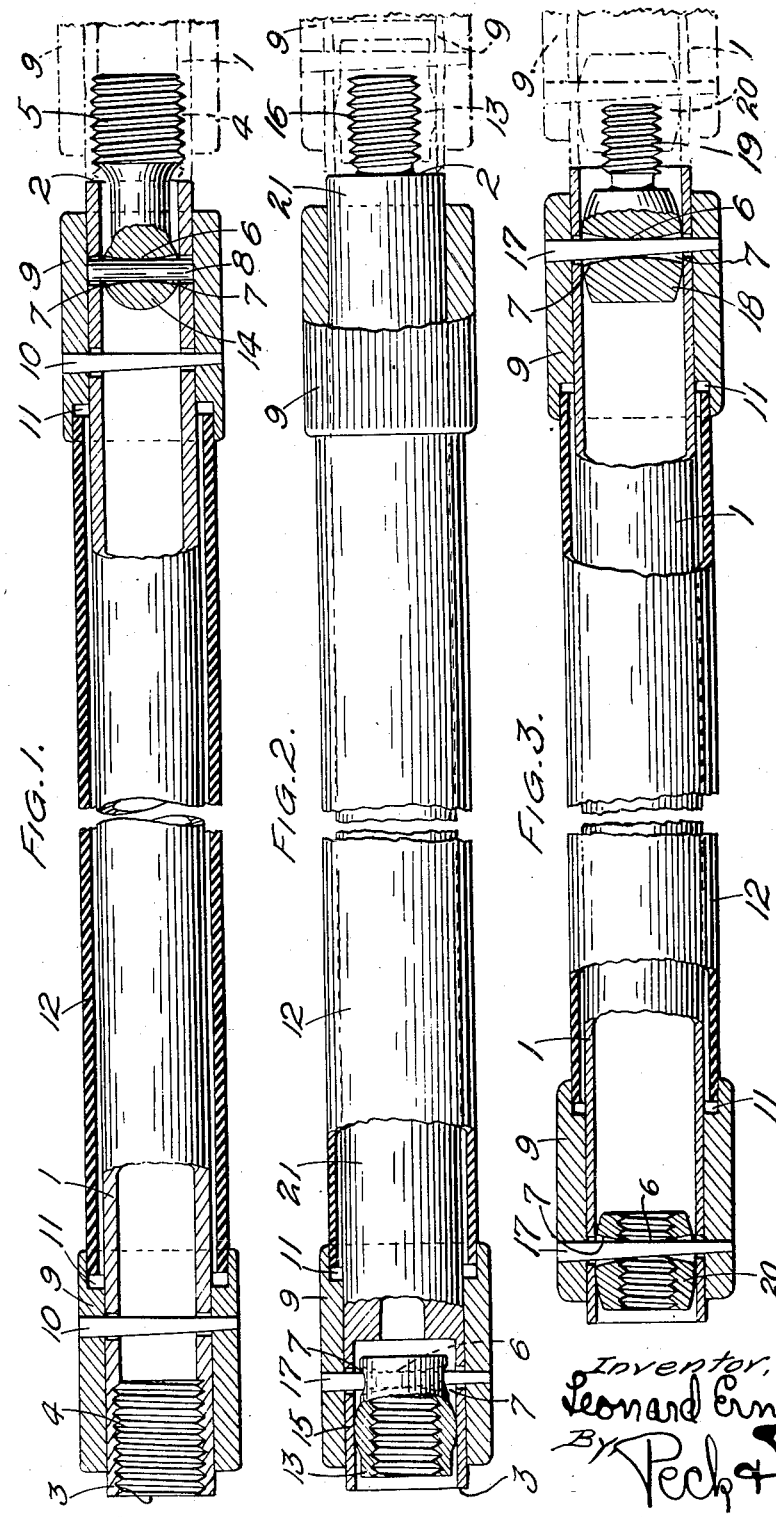
Inventor,
Leonard Ernest Glover,
By Peck & Peck
Attys.

Patented May 24, 1949

2,471,322

UNITED STATES PATENT OFFICE 2,471,322

MICROMETER GAUGE AND THE LIKE

Leonard Ernest Glover, Leatherhead, England, assignor to himself and Pitter Gauge & Precision Tool Co. Limited, Leatherhead, England, a company of Great Britain Application July 28, 1944, Serial No. 546,992
In Great Britain August 14, 1943

4 Claims. (Cl. 287—12)

This invention relates to linear-dimension gauges and it refers more particularly to a length bar for use as or with a linear-dimension gauge. Such length bars may be employed with a micrometer end to enable one such micrometer end to be used in gauges of varying lengths.

The length bars are provided in various lengths so that by securing two or more together any desired length of gauge may be produced. The ends of each bar are carefully lapped and it is necessary that adjacent lapped faces of length bars shall accurately bed together. Heretofore a length bar has been provided on one end with a threaded extension to engage the internally threaded end of the succeeding length bar to be attached to it. When the threaded extension is solid with the length bar or is fixed thereto any inaccuracy in the thread will prevent the adjacent faces from bedding accurately. In order to overcome this difficulty the co-operating threads have been such that when the adjacent length bars have been secured together there is a certain amount of freedom in the threaded connection. The thread is usually a fine thread and difficulties are then experienced. It has also been proposed to secure together two length bars by a threaded plug which is screwed into the internally threaded ends of the bars and the thread of the plug has been of such dimensions that it has a certain amount of freedom in both threaded ends. A disadvantage of such an arrangement is that the threaded plug is a separate member and may become lost or damaged and further sometimes insufficient freedom can be provided for the accurate bedding of the lapped faces.

It is an object of the present invention to provide a construction of length bar in which these disadvantages are overcome.

According to the present invention a length bar for use as or with a linear-dimension gauge has a threaded plug part at one end and an internally threaded part at the other end, one at least of said parts having freedom of angular movement in all directions.

Preferably the part having freedom of movement has an end with a transverse hole which flares outwardly from the centre and it is mounted within the end of the length bar by a pin passing through the hole and having its ends in the wall of the length bar.

According to a further feature of the invention the length bar is provided with a ferrule which is somewhat loose on the length bar and which is disposed over the pin and constitutes the means for retaining the latter in position.

It is also a feature of the invention that the ferrule is secured by a pin fixed at its ends only in the ferrule and passing through slightly larger holes in the length bar.

Forms of length bar according to the present invention and for use with an internal micrometer gauge will now be described by way of example and with reference to the accompanying drawings, wherein—

Fig. 1 shows partly in section one form in which the plug part has freedom of movement and the internally threaded part is constituted by the end of the bar, Fig. 2 shows partly in section a second form in which the internally threaded part has freedom of movement and the plug part is constituted by the end of the bar and is therefore fixed, and Fig. 3 shows partly in section a third form in which both the plug part and the internally threaded part have freedom of movement.

Like references refer to like parts throughout the drawings.

Referring to Fig. 1 the length bar comprises a piece of steel tube 1 of definite and accurate length between its end faces 2, 3. These faces are hardened and are lapped to produce great accuracy. One end of the tube is internally threaded at 4 and at the opposite end there is mounted a plug extension. This plug has a threaded outer end 5 projecting from the tube and an inner end which is disposed within the tube. A transverse hole 6 with flaring ends 7 is formed in the inner end and a pin 8 passing through said hole and into holes in the wall of the tube secures the plug to the tube. The flaring may be partial, for example at two places at opposite ends of a diameter, or it may be all round so that the hole is bell mouthed. The flared hole provides a certain amount of freedom of angular movement in all directions in relation to the tube. The ends of the pin 8 are comparatively loose in the wall of the tube and it is held in place by a ferrule 9 for example of metal and having a knurled outer surface whilst the bore fits on to the tube. This ferrule is held in place by a taper pin 10 fixed in holes in the wall of the ferrule and passing through holes in the wall of the tube. The holes in the wall of the tube are slightly larger than the pin so that distortion in assembling is prevented. A similar ferrule 9 is mounted on the opposite end of the tube. The adjacent ends of the ferrules are recessed at 11 to accommodate a protective tube 12 so that heat from the hands will not be transmitted directly to the tube 1 when the length bar is handled. This construction forms the subject-matter of the co-pending application Serial No. 546,993, now Patent No. 2,433,968, dated January 6, 1948.

In use when the length bar is applied to the micrometer gauge or to another length bar the threaded extension 5 of the plug is screwed into the internally threaded end 4 of the gauge or other bar until the adjacent faces 2, 3 are brought up tight. The limited angular movement permitted by the mounting of the plug enables the two faces to be brought accurately together.

Reference will now be made to Fig. 2. The parts with like references are exactly the same as those illustrated in Fig. 1. In this case the tube 21 is thicker, and it has a threaded extension 16 at one end. The other end of the tube is bored out to receive an internally threaded part 13. The tail end of this threaded member has a transverse hole 6 with flaring ends 7 and it is secured within the bar by a pin 17 passing through said hole and holes in the wall of the tube and fixed in the ferrule 9. The flared hole produces a certain amount of freedom of angular movement of the internally threaded part 13 in all directions in relation to the tube 21. The ends of the pin 17 are comparatively loose in the wall of the tube. A similar ferrule 9 is mounted on the opposite end of the tube.

In use when the length bar is fitted to the micrometer gauge or to another length bar the threaded extension 16 is screwed into the internally threaded part 13 of the gauge or other bar until the adjacent faces 2, 3 are brought up tight. The limited angular movement permitted by the mounting of the internally threaded part 13 within the tube 21 enables the two faces 2, 3 to be brought accurately together.

In the form of the invention illustrated in Fig. 3 both the plug part 18 with the threaded extension or outer end 19 and the internally threaded part 20 have transverse holes 6 with flaring ends 7 and they are secured each by a pin 17 passing through its appropriate hole and holes in the wall of the tube so that it is slightly loose therein and fixed in its respective ferrule 9. The parts 18 and 20 thus have freedom of angular movement.

It will be understood that other forms of mounting of the plug part or internally threaded part may be employed to give freedom of angular movement of the said parts. These will be well known and need not be illustrated. Thus types of universal joint might be employed mounted within the length bar. Or the spherical inner end 14 of the plug part illustrated in Fig. 1 might be mounted in a spherical carrier fixed in the bar 1. Or the plug part or internally threaded parts may have a spherical outer surface 15 as illustrated in Fig. 2 and be mounted in a spherical carrier.

The threaded end 19 of the plug part accurately fits the internal threaded part to which it is applied thus reducing the danger of damaging the thread, for example stripping it due to slack fitting.

Sometimes the plug part may be a plug fixed in the end of the bar.

In some cases the ferrule 9 may be dispensed with.

The length bar may be used with all kinds of length measuring apparatus, such as micrometer gauges in which the position of an anvil or like bearing surface is controlled by a screw or by other means such as a pack of accurately dimensioned blocks, for example slip gauges, or in which it is movable and attached to indicating mechanism.

What I claim is:

1. A length bar for use in gauging lengths and adapted to be connected to another gauging member having its end faces accurately finished in a plane at right angles to the axis of the bar, a threaded plug part extending beyond one end and an internally threaded part at the other end, one of said parts having an end with a transverse hole which flares outwardly from the centre and said end disposed within the end of the length bar and a pin passing through the hole and having its ends in the wall of the length bar.

2. A length bar for use in gauging lengths and adapted to be connected to another gauging member having its end faces accurately finished in a plane at right angles to the axis of the bar, a threaded plug part extending beyond one end and an internally threaded part at the other end, one of said parts having an end with a transverse hole which flares outwardly from the centre and said end disposed within the end of the length bar, a pin passing through the hole and having its ends in the wall of the length bar and a ferrule mounted somewhat loosely on the length bar and disposed over the pin to constitute means to retain the latter in position.

3. A length bar for use in gauging lengths and adapted to be connected to another gauging member having its end faces accurately finished in a plane at right angles to the axis of the bar, a threaded plug part extending beyond one end and an internally threaded part at the other end, one of said parts having an end with a transverse hole which flares outwardly from the centre and said end disposed within the end of the length bar, a pin passing through the hole and having its ends in the wall of the length bar, a ferrule mounted somewhat loosely on the length bar, a pin fixed at its ends only in the ferrule and said length bar having holes slightly larger than the pin which passes through them.

4. A length bar for use in gauging lengths and adapted to be connected to another gauging member having its end faces accurately finished in a plane at right angles to the axis of the bar, a threaded plug part extending beyond one end and an internally threaded part at the other end, one of said parts having an end with a transverse hole which flares outwardly from the centre and which is mounted within the end of the length bar, a ferrule mounted somewhat loosely on the length bar, a pin fixed at its ends only in the ferrule and said length bar, having holes slightly larger than the pin which passes through them, said pin also passing through the transverse hole which flares outwardly in the one part.

LEONARD ERNEST GLOVER.

REFERENCES CITED

The following references are of record in the file of this patent:

UNITED STATES PATENTS

| Number | Name | Date |
|---|---|---|
| 395,399 | Mast | Jan. 1, 1889 |
| 852,872 | Collins | May 7, 1907 |
| 1,167,599 | Sanford | Jan. 11, 1916 |
| 1,212,361 | Kennedy | Jan. 16, 1917 |
| 1,392,220 | Quint | Sept. 27, 1921 |
| 1,528,967 | Bersted | Mar. 10, 1925 |
| 1,685,446 | Benedict | Sept. 25, 1928 |
| 1,903,576 | Skeel et al. | Apr. 11, 1933 |

FOREIGN PATENTS

| Number | Country | Date |
|---|---|---|
| 15,377 | Great Britain | July 11, 1903 |